(12) United States Patent
Muhonen et al.

(10) Patent No.: US 7,116,984 B1
(45) Date of Patent: Oct. 3, 2006

(54) LOCATION SERVICES IN A PACKET RADIO NETWORK

(75) Inventors: Ahti Muhonen, Hirvihaara (FI); Serge Haumont, Helsinki (FI); Mikko Puuskari, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/830,816

(22) PCT Filed: Oct. 26, 1999

(86) PCT No.: PCT/FI99/00894

§ 371 (c)(1),
(2), (4) Date: Apr. 27, 2001

(87) PCT Pub. No.: WO00/25545

PCT Pub. Date: May 4, 2000

(30) Foreign Application Priority Data

Oct. 27, 1998 (FI) .................................... 982331

(51) Int. Cl.
*H04M 1/00* (2006.01)

(52) U.S. Cl. ................. 455/456.1; 455/456.2; 455/456.3; 455/456.5; 455/426.1; 370/329; 370/437

(58) Field of Classification Search ............. 455/456.1, 455/456.2, 456.3, 456.5, 426.1, 432.1, 445
See application file for complete search history.

(56) References Cited

U.S. PATENT DOCUMENTS

| | | | | |
|---|---|---|---|---|
| 5,590,133 A | * | 12/1996 | Billstrom et al. | 370/349 |
| 5,802,058 A | * | 9/1998 | Harris et al. | 370/410 |
| 6,094,581 A | * | 7/2000 | Fried et al. | 455/449 |
| 6,219,557 B1 | * | 4/2001 | Havinis | 455/456.4 |
| 6,356,761 B1 | * | 3/2002 | Huttunen et al. | 455/456.1 |
| 6,385,179 B1 | * | 5/2002 | Malcolm et al. | 370/329 |
| 6,560,457 B1 | * | 5/2003 | Silver et al. | 455/445 |
| 6,608,832 B1 | * | 8/2003 | Forslow | 370/353 |
| 2001/0041535 A1 | * | 11/2001 | Karmel | 455/12.1 |
| 2002/0049800 A1 | * | 4/2002 | Kobayashi et al. | 709/1 |

FOREIGN PATENT DOCUMENTS

| | | |
|---|---|---|
| EP | 748 727 | 12/1996 |
| EP | 767 594 | 4/1997 |
| EP | 930 513 | 7/1999 |
| JP | 08-126060 A | 5/1996 |
| JP | 08-228380 A | 9/1996 |
| JP | 10-023068 A | 1/1998 |
| JP | 10-032866 A | 2/1998 |
| JP | 10-079979 A | 3/1998 |
| JP | 10-248082 A | 9/1998 |

* cited by examiner

*Primary Examiner*—Matthew Anderson
*Assistant Examiner*—Minh Dao
(74) *Attorney, Agent, or Firm*—Pillsbury Winthrop Shaw Pittman LLP

(57) ABSTRACT

A method for providing location service information related to a mobile station in a mobile communications system supporting connections of a first type, for example circuit-switched, and a second type, for example packet-switched. The method comprises receiving a request from a requesting entity; retrieving the location service information related to the mobile station; and providing a response to the request. The method further comprises determining a preferred type of connection for the retrieving based on a first set of predetermined criteria; and performing, in the retrieving, at least a first attempt via a preferred type of connection.

16 Claims, 2 Drawing Sheets

LOCATION SERVICES IN A PACKET RADIO NETWORK

This application is the National Phase of International Application PCT/FI99/00894 filed Oct. 26, 1999 which designated the U.S. and that International APPLICATION was published under PCT Article 21(2) in English.

BACKGROUND OF THE INVENTION

The invention relates to methods and equipment for providing location services in a telecommunications system comprising a packet radio network, and for the use of the packet radio network as a bearer for location information. Mobile communications systems provide mobile users with means to communicate from an arbitrary location within a Public Land based Mobile Network PLMN. Initially, mobile communications systems offered more or less the same services as do wired communications systems, i.e. voice calls, data calls and fax calls. The ever-changing location of the mobile user has been seen more as a necessary evil than a useful piece of information which the wired communications systems cannot deliver. A more modern vision is that by making full use of the user's location mobile communications systems can achieve competitive advantages over wired communications systems. This information can be used for customizing certain value-added services according to the user's location. Such location-specific value-added services include weather forecasts, entertainment programmes, timetables, navigation and locating a mobile user in an emergency. Additionally, the user's location can also be used for law-enforcement purposes.

In a conventional cellular mobile communications system, such as GSM (Global System for Mobile Communication), a mobile station can be located within one cell if the mobile station is having an ongoing call. Without such an ongoing call the location is known only within a location area, which typically comprises several cells. Even if the location is known within one cell, there is still considerable ambiguity concerning the location, considering that the diameter of a GSM cell can be as large as 70 km. More precise location service is the subject of standardization work being performed in a US standardization group called T1P1. There are several known methods by which a mobile station can be located with reasonable precision. For example, a mobile station can have an integrated GPS receiver, whereby it can determine its own coordinates and send them to the network. A mobile station without an integrated GPS receiver can be located e.g. by triangulation using three base stations. Details of the location procedure are not relevant to this invention, however, and a reference is made to the relevant T1P1 specifications.

Within the context of this application, the following conventions will be used. 'Location management' refers to the task of tracking the location of a mobile station in terms of location/routing areas and cell/network element identifiers. Thus, location management is performed in any mobile communications system, and it is a necessary task for routing calls to a mobile subscriber. In contrast, 'location service' (LCS) refers to the task of tracking the location of a mobile station in terms of geographical coordinates. This task is not necessary for routing calls. Rather, it is a value-added service, or it can be used for producing value-added services.

A problem with prior art location service systems is that packet radio subscribers are completely ignored. There are no known methods to locate a mobile station with a subscription only to a packet radio network, such as GPRS (General Packet Radio Service). A brute-force approach would be to implement a separate location service for the packet-switched network, but this would result in duplicating several network elements. There are no known signalling conventions enabling the use of the location service for the circuit-switched network also in the packet-switched network.

DISCLOSURE OF THE INVENTION

An object of the invention is to provide a mechanism for implementing a location service to a packet radio network, such as the GPRS. Another object is to implement the location service in a manner which does not needlessly duplicate existing functionality and/or increase the signalling overhead. Another object of the invention is to offer packet-based bearers for the location services in a circuit-switched network, such as GSM. These objects are achieved with a method and equipment which are characterized by what is disclosed in the attached independent claims. Preferred embodiments of the invention are disclosed in the attached dependent claims.

According to a first aspect of the invention, there is provided a method for providing location service information related to a mobile station in a mobile communications system supporting connections of a first type (e.g. circuit-switched) and a second type (e.g. packet-switched), the method comprising the steps of: 1) receiving a request from a requesting entity; 2) retrieving the location service information related to the mobile station; and 3) providing a response to the request. The method according to the invention is characterized by 4) determining a preferred type of connection for the retrieving step on the basis of a first set of predetermined criteria; and 5) performing, in the retrieving step, at least a first attempt via the preferred type of connection.

Preferably, the first set of predetermined criteria comprises checking whether the mobile station currently has an active connection via at least one of the types of connection. The checking may be based on examining the request from the requesting entity.

If the first attempt results in a failure, a second set of predetermined criteria may comprise the reason for the failure, and the retrieving step may comprise performing a second attempt via the remaining type of connection in response to fulfilment of the second set of predetermined criteria. Preferably, the second set of predetermined criteria is fulfilled if the first attempt fails but the reason for the failure is not "service not allowed", and the second attempt via the remaining type of connection has not been unsuccessfully performed earlier.

If the mobile station is having an ongoing call, the preferred type of connection is circuit-switched, otherwise it is packet-switched. The method may comprise establishing circuit-switched communications for the mobile station if packet-switched communications are not established.

Alternatively, the method may comprise establishing at least one implicit Packet Data Protocol, or PDP, context. Establishing the PDP context may comprise allocating a predefined Network layer Service Access Point Identifier, or NSAPI, value. The implicit PDP context may be established between the mobile station and the support node and/or a support node and a Serving Mobile Location Centre currently serving the mobile station. The latter PDP context may also be an explicit one.

It should be noted that the idea of establishing an implicit PDP context can used separately, for purposes other than location services.

Most of the above-mentioned decision-making steps are preferably performed by a Gateway Mobile Location Centre GMLC (optionally aided by other network elements, such as the HLR and/or the VMSC), because all LCS inquiries are routed via the GMLC. According to the current T1P1 specifications, there is a GMLC in every PLMN. As a consequence, according to a second aspect of the invention, a GMLC is adapted to carry out the method according to the first aspect of the invention.

BRIEF DESCRIPTION OF THE DRAWINGS

The invention will be described in more detail by means of preferred embodiments with reference to the appended drawing wherein.

DETAILED DESCRIPTION OF THE INVENTION

Figure 1:
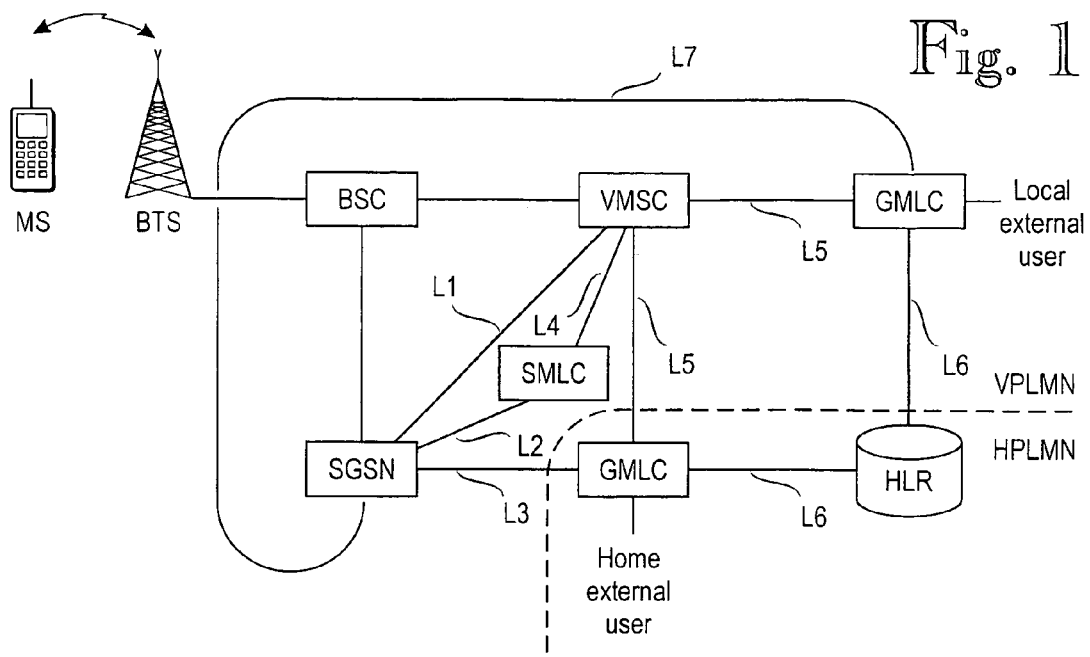
FIG. 1 is a block diagram illustrating one embodiment of a telecommunications system where the invention can be used.

FIG. 1 is a block diagram illustrating a preferred embodiment of the invention. The invention will be described in connection with the GSM and the GPRS (General Packet Radio Service), substantially in accordance with the relevant ETSI recommendations. However, it should be understood that the GSM and GPRS systems have been chosen only for the purposes of illustration, and the invention is applicable in any telecommunications system supporting circuit-switched and packet-switched connections.

Apart from the Mobile Location Centres MLC, i.e. the Gateway Mobile Location Centres GMLC and the Serving Mobile Location Centres SMLC, the remaining blocks are known from prior art GSM and GPRS systems. The MLCs perform location services related to mobile equipment and/or subscribers. The MS is normally a mobile phone, but it can be any entity which uses the standard air interface, for example a measurement unit connected to the network through the air interface. A system as shown in FIG. 1 can be implemented with interfaces as follows. The L1 interface (VMSC/SGSN) can be a MAP interface over SS7 or IP, or a GPRS Gs interface. The L2 interface (SGSN/SMLC) and the L7 interface (SGSN/GMLC) can be a MAP interface over SS7 or IP, or a GPRS Gn interface. The L3 interface (SGSN/Home GMLC) can be a MAP interface over SS7 or IP, or a GPRS Gp interface. The L4 interface (MSC/SMLC), the L5 interface (GMLC/VMSC) and the L6 interface (HLR/GMLC) can be a MAP interface over SS7 or IP. Preferably, the protocols and the protocol messages on the L3, L5 and L7 interfaces are the same, for example the same MAP interfaces and messages.

Figure 2:
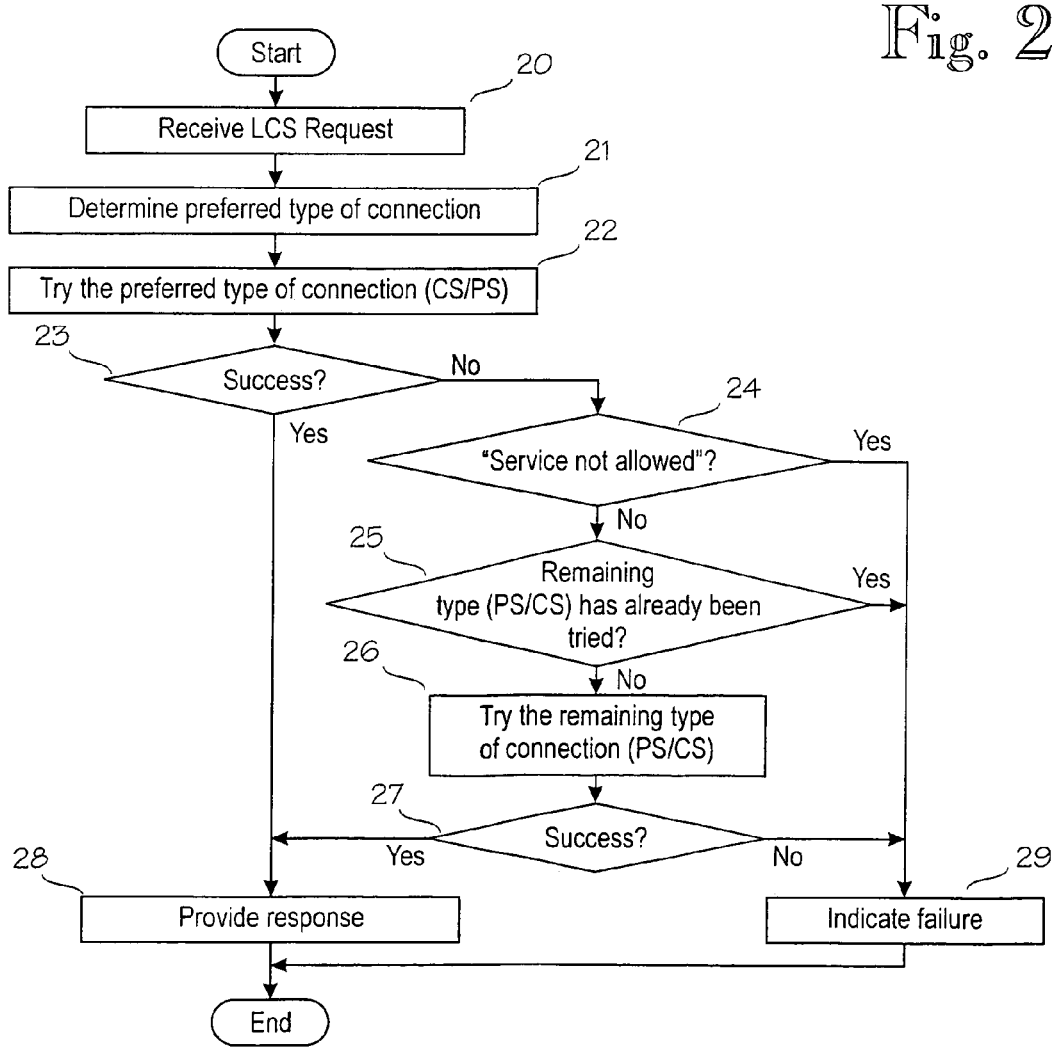
FIG. 2 is a flow chart illustrating a general concept of the invention.

FIG. 2 is a flow chart illustrating a general concept of the invention from the point of view of a Gateway Mobile Location Centre GMLC. In step 20, the GMLC receives an LCS request from a requesting entity/application. In step 21, the GMLC determines the preferred type of connection (circuit-switched or packet-switched), and in step 22 it makes a first attempt via the preferred type of connection (e.g. circuit-switched). In step 23, the GMLC tests whether the first attempt was successful, and if yes, in step 28 it sends a response to the entity/application which sent the initial request in step 20. If the first attempt failed, the GMLC may check in step 24 whether the failure was due to barring restrictions (i.e. the service was not allowed). If the failure was due to barring restrictions, there is no point in trying the remaining type of connection (e.g. packet-switched), and in step 29 the failure is indicated to the requesting entity. The same holds for step 25 wherein it is tested whether or not the remaining type of connection has already been tried. Otherwise, in step 26 a second attempt is made via the remaining type of connection. In step 27, the GMLC determines whether the second attempt was successful, and if yes, in step 28 it sends a response to the entity/application which sent the request in step 20. Otherwise, it indicates the failure in step 29.

Figure 3A:
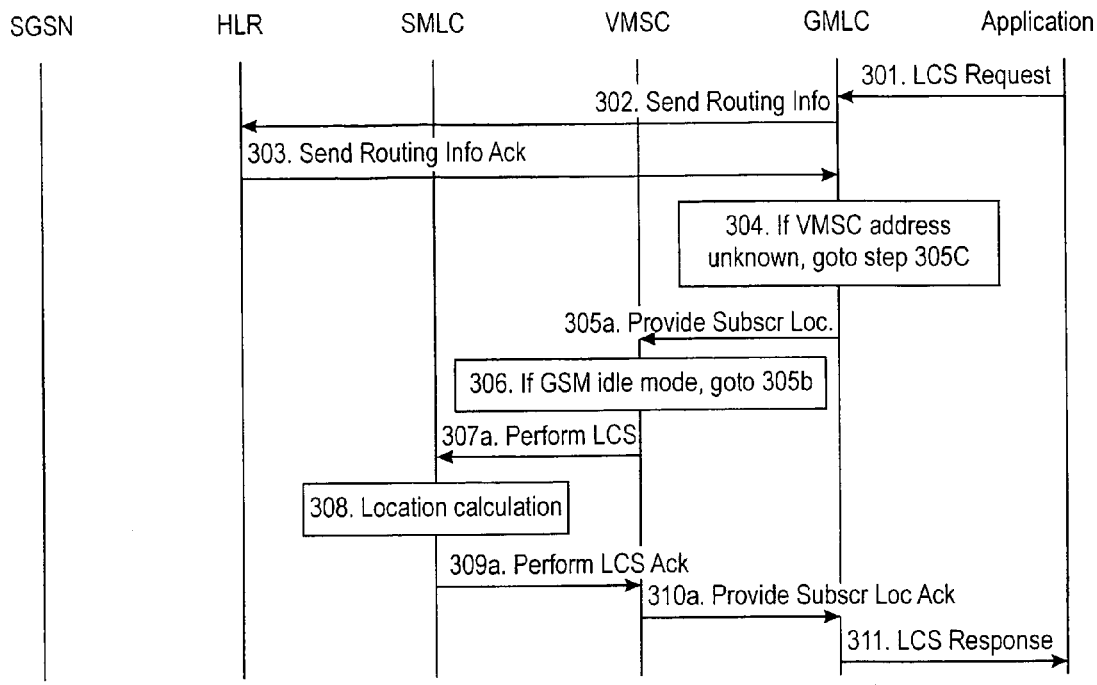
FIGS. 3A to 3C are signalling diagrams depicting different scenarios in a system as shown in FIG. 1.
Figure 3B:
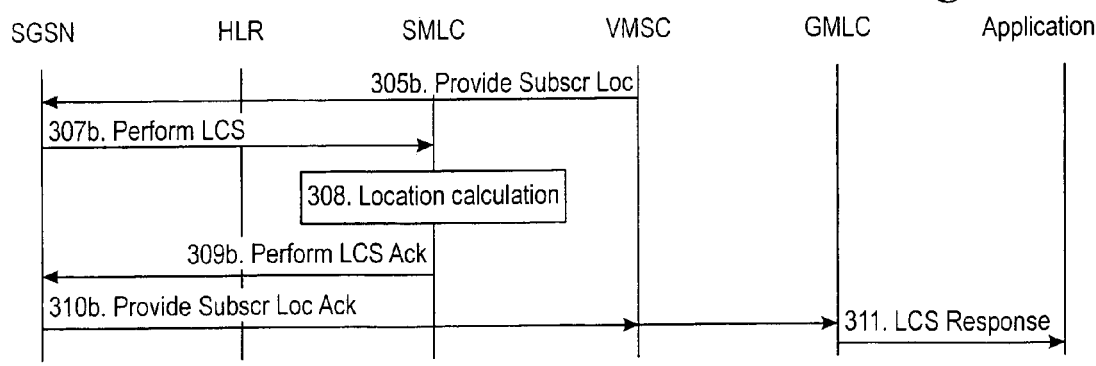
Figure 3C:
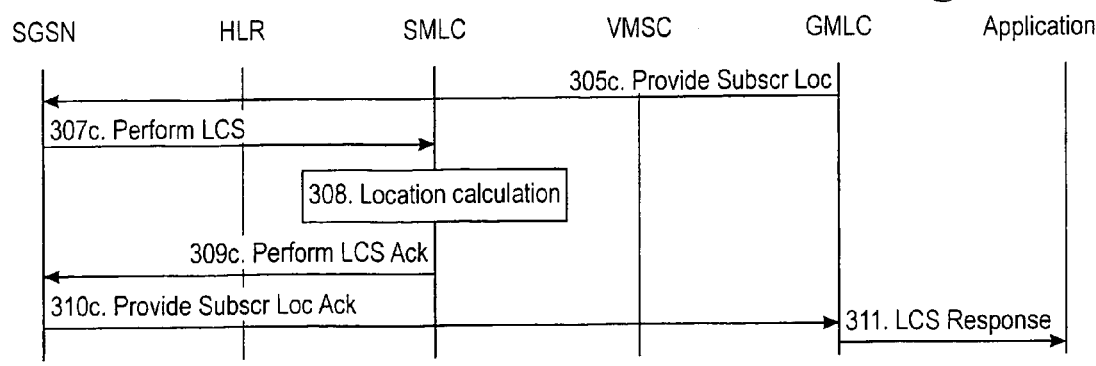

FIGS. 3A to 3C are signalling diagrams depicting three different scenarios in a system as shown in FIG. 1. The system comprises an SMLC element for generic location calculation and a GMLC element according to the invention. In step 301, an external LCS application/entity requests some LCS service from a GMLC. The GMLC verifies the identity of the LCS application and its subscription to the LCS service requested. The GMLC also derives an identifier (e.g. the MSISDN) of the MS to be located and the LCS QoS from either the subscription data or from the data supplied by the requesting application. In step 302, the GMLC checks whether or not the MS subscriber is a GSM subscriber, i.e. whether or not there is a VMSC and/or an SGSN address for the MS. The GMLC sends a MAP_SEND_ROUTING_INFO_FOR_LCS message to the HLR of the MS to be located. The message is routed to the HLR of the HPLMN using the MSISDN number in the called party address on the SCCP layer. If the GMLC already knows the VMSC location and the IMSI for the particular MSISDN (e.g. the GMLC has stored the results from a previous location request to a cache-type memory), steps 302 and 303 may be skipped. Also, if the GMLC has stored an SGSN address for the user and at the last inquiry there was no VMSC address in the HLR, the GMLC may reuse the SGSN address and skip steps 302 and 303 altogether. However, even if the VMSC and SGSN addresses are present at the GMLC for a particular user, the GMLC may perform steps 302 and 303 in order to make sure that it has the most recent information. (In other words, if the GMLC stores the information in a cache, the information preferably has a maximum lifetime.) In step 303, the HLR verifies that the E. 164 address of the GMLC, contained in the SCCP calling party address, corresponds to a known GSM network element that is authorized to request MS location information. (E. 164 is an addressing system used in the SS7 signalling system.) The HLR then returns the IMSI for the particular MS, as well as the current VMSC address and the current SGSN address, if available.

Beginning from step 305, the three scenarios differ from each other. If the GMLC knows the address of the VMSC serving the mobile station, in step 305a the GMLC sends a MAP_PROVIDE_SUBSCRIBER_LOCATION message to the VMSC indicated by the HLR. If no VMSC address is available, in step 305c the message is sent to the SGSN address indicated by the HLR. This message carries the MS subscriber's IMSI, LCS QoS information (e.g. accuracy, response time, preferred/required positioning method), an indication of whether the LCS application has override capability, and the current SGSN address if available.

If the message in step 305a was sent to the VMSC, it verifies possible LCS barring restrictions in the MS user's subscription profile in the VLR. (In this case the PROVIDE_SUBSCRIBER_LOCATION message sent to the VMSC should include the SGSN address which will be used in step 305b, if this step is taken.) Otherwise, the SGSN can perform these checking functions. If the LCS is barred and an LCS application in the same country does not have override capability, an error response is returned to the GMLC. If the MS is in GSM Active mode (for example, there is an ongoing call), in step 307a the VMSC sends a MAP_PERFORM_LOCATION_SERVICE message to its associated SMLC. The signalling channels of the ongoing call are used for the message exchange between the SMLC and the MS. If the MS is in GSM Idle mode, in step 305b the VMSC relays the MAP_PROVIDE_SUBSCRIBER_LOCATION message it received from the GMLC to the SGSN, i.e. to the address received from the GMLC. This address might be an IP address or an SS7 number, depending on the protocols used between the VMSC and the SGSN on the one hand and between the GMLC and the SGSN on the other hand. If such an SGSN address does not exist or is not available, or if after step 309b the SGSN indicates that the subscriber is unknown, the VMSC establishes a channel over the circuit-switched service for location purposes and steps 307a–310a will be executed. If these steps fail, the GMLC will be informed that the LCS has failed via both packet-switched and circuit-switched services. If the SGSN receives the location request message from the VMSC, in step 307b it sends a MAP_PERFORM_LOCATION_SERVICE message to its associated SMLC. The SMLC information should be configured beforehand at the SGSNs. If the MS is unknown in the MSC/VLR, this fact will be indicated in an error message to the GMLC. Then, if an SGSN address was also provided in step 303, the GMLC will try to locate the MS via the SGSN (and continue at step 305c). If there was no VMSC address for the MS, in step 305c the MAP_PROVIDE_SUBSCRIBER_LOCATION message is sent directly to the SGSN. Having checked possible barring and other restrictions, in step 307c the SGSN sends the MAP_PERFORM_LOCATION_SERVICE message to its associated SMLC. In step 308, Generic Location Calculation is performed in or via the SMLC. For details concerning the location calculation, reference is made to the relevant ETSI specifications. However, such details are not essential for understanding the present invention.

In step 309, the SMLC returns the location information to the requesting entity (the VMSC in step 309a, the SGSN in steps 309b and 309c). In step 310, the location information is returned to the GMLC. (In step 310a, the VMSC returns the location information directly to the GMLC. In step 310b, the SGSN returns the location information via the VMSC to the GMLC. In step 310c, the SGSN returns the location information directly to the GMLC.) Finally, in step 311, the GMLC returns the MS location estimate to the requesting LCS entity/application. If the LCS application requires it, the GMLC may first transform the universal location coordinates provided by the VMSC into some local geographic system. The GMLC may record billing for both the LCS application and inter-network revenue charges from the VMSC network. Apart from the tests in steps 304 and 306, the subject matter of FIG. 3A substantially corresponds to the relevant ETSI specifications.

Error Handling

If the GMLC receives an error report from either the VMSC or the SGSN indicating that one or the other does not know the subscriber in question, or if the GMLC could not reach the intended node at all and if the GMLC is using old information (e.g. information stored in a cache), the GMLC may perform another HLR interrogation to get up-to-date address information. After getting the new information, the GMLC may start the operation from the beginning. Also, if it could not reach the VMSC the GMLC can try to contact the SGSN directly. If, in turn, the VMSC could not reach the SGSN after a certain number of attempts, or if the MS is unknown in the SGSN, it may perform the location operation itself over circuit-switched services. If this location operation is unsuccessful, the VMSC should return an error response to the GMLC and indicate that the location operation has failed via both the SGSN and the VMSC. The GMLC will then not try the SGSN route.

An Alternative Embodiment

In step 301, the GMLC may determine on the basis of the LCS Request whether or not this request is related to an ongoing call. The basis for this determination may be for example an explicit parameter, such as a called-party number in the LCS request, or an implicit indication, such as the source address of the LCS request. If in step 303 both an SGSN address and an MSC address are returned, then in step 304 the GMLC may operate as follows.

If the LCS is related to an ongoing call, the GMLC sends the PROVIDE_SUBSCR_Loc to the VMSC handling the call. Normally, the signalling channel of the ongoing call will be used for message exchange between the SMLC and the MS. Possible errors will be reported to the GMLC which should then try the SGSN route, unless the error was due to barring (i.e. "service not allowed").

If the LCS is not related to an ongoing call, the GMLC sends the PROVIDE_SUBSCR_Loc message to the SGSN serving the MS. The SGSN attempts to locate the MS using steps 305c to 310c shown in FIG. 3C. If the attempt fails for any other reason than barring, the SGSN will return an error report to the GMLC. Next, the GMLC will try the VMSC route (i.e. it sends the PROVIDE_SUBSCR_Loc message to the VMSC). Then the VMSC will try to locate the MS via the VMSC (using steps 307a to 310a), although the MS is in idle mode.

According to this embodiment, if only one address (the VMSC or the SGSN) is provided in step 303, the GMLC tries this address. If the address relates to a VMSC, steps 307a to 310a will be used, and if the address relates to an SGSN, steps 307c to 310c will be used.

MS-MLC Location-Related Communication

The invention allows several options to transfer information between the MS and the MLC, as well as between the SGSN and the GMLC, depending on the chosen location calculation method. However, the GMLC-SGSN interface is preferably similar to the GMLC-VMSC interface.

It is apparent to a skilled reader that the signalling diagrams in FIGS. 3A to 3C are somewhat simplified, because some routine steps (such as PDP context activation) have been omitted. It is to be expected that location services will play an increasingly important role in making mobile communication systems more competitive with wired communication systems. Thus the routine task of establishing a PDP context for the purpose of location services may cause significant overhead traffic. To eliminate this overhead traffic, there may be an implicit PDP context between the mobile station MS and the SGSN. For this purpose, one NSAPI (Network layer Service Access Point Identifier) value should be reserved and standardized for location services. In the GPRS support nodes SGSN and GGSN, the NSAPI identifies the PDP context associated with a certain PDP address. The existence of the implicit context allows the MS and the SGSN to send a location request or a response message at any time. Thus, no explicit context activation is needed. The SGSN forwards a mobile-originated message using the reserved NSAPI value to the serving MLC. Similarly, a mobile-terminated message is forwarded to the MS at any time by means of the special NSAPI value. A radio link needs to be established between the MS and the SGSN for the message transmission.

Communication between the SGSN and the serving MLC can be established in several ways. The implicit context approach can be reused between these entities as well. Alternatively, explicit context establishment can take place on this interface (with the special NSAPI value). A benefit of this approach is that the MLC knows all the users who are currently tracked, and in the case where a user is handed over to another SGSN which is served by another MLC, the context can be explicitly released. In addition, if the calculation is interrupted, i.e. will not be completed, the old SGSN can indicate the failure by sending an error report to the VMSC or the GMLC. The VMSC may relay this error report to the GMLC, which may interrogate the HLR again to get the new SGSN address in order to be able to initiate the location process again.

Yet another option would be to define signalling messages between the SGSN and the SMLC. This interface may be the same as the interface between the SMLC and the VMSC, for example a MAP interface.

Alternatively, conventional PDP context activation can be used between the MS and the SMLC, which in this case looks like a special GGSN to the MS. The context activation can be performed automatically in connection with a GPRS Attach procedure or only on demand. A special NSAPI can be allocated for this context, but it is not necessary with this option. If automatic context activation takes place, a special APN (e.g. "MLC") indicates to the SGSN that a location context is requested. The SGSN then relays the context activation to the MLC serving this SGSN (the SGSN configuration information). Alternatively, the MLC can request that network-initiated PDP context activation takes place (e.g. with a special NSAPI indicating to the user's mobile station that a location context needs to be established).

Special signalling messages can be defined for the air interface (MS-SGSN) and between the SGSNs and the MLCs. In this case, the SGSN relays these messages to the MS and the MLC based on the configuration information (MLC) and user's IMSI. These messages can be for example MAP protocol messages.

Although the invention has been described in connection with the GSM and GPRS systems, it is not limited to these examples, but the invention can be modified within the scope of the appended claims.

Abbreviations:
APN=Access Point Name
GMLC=Gateway Mobile Location Centre
GGSN=Gateway GPRS Support Node
GPRS=General Packet Radio Service
GPS=Global Positioning System
GSM=Global System for Mobile Communication
HLR=Home Location Register
HPLMN=Home PLMN
LCS=Location Services
MLC=Mobile Location Centre
MSC=Mobile services Switching Centre
NSAPI=Network (layer) Service Access Point Identifier
PLMN=Public Land based Mobile Network
SAP=Service Access Point
SCCP=Signalling Connection and Control Part
SGSN=Serving GPRS Support Node
SMLC=Serving Mobile Location Centre
VLR=Visitor Location Register
VMSC=VLR+MSC

REFERENCES

T1P1 8p150581: Location Service (LCS) stage 0 requirements
T1P1 8p151045: Location Service (LCS); service description, stage 1
T1P1 8p151056: Location Service (LCS); functional description, stage 2
T1P1 8p153351: Reasoning for GPRS as LCS Carrier and Proposed Additions All references are incorporated herein by reference.

The invention claimed is:

1. A method for providing location service information related to a mobile station in a mobile communications system supporting connections of a first type and a second type, the method comprising:
   receiving a request from a requesting entity;
   retrieving the location service information related to the mobile station; and
   providing a response to the request;
   wherein the retrieving further comprises:
      determining a preferred type of connection for the retrieving based on a first set of predetermined criteria; and
      performing, in the retrieving step, at least a first attempt to retrieve the location service information via the preferred type of connection.

2. The method of claim 1, wherein the first set of predetermined criteria is determined by checking whether the mobile station currently has an active connection via at least one type of connection.

3. The method of claim 2, wherein the checking is based on examining the request.

4. The method of claim 1, wherein if the first attempt results in a failure, a second set of predetermined criteria is determined based on a reason for the failure, and the retrieving comprises performing a second attempt via remaining types of connection in response to fulfillment of the second set of predetermined criteria.

5. The method of claim 4, wherein the second set of predetermined criteria is fulfilled if:
   the first attempt fails but the reason for the failure is not "service not allowed"; and
   the second attempt via the remaining type of connection has not been unsuccessfully performed earlier.

6. The method of claim 1, wherein the first type of connection is circuit-switched and the second type of connection is packet-switched.

7. The method of claim 6, wherein if the mobile station is having an ongoing call, the preferred type of connection is circuit-switched, otherwise it is packet-switched.

8. The method of claim 6, further comprising establishing circuit-switched communications for the mobile station if the packet-switched communications are not established.

9. The method of claim 6, further comprising establishing at least one implicit Packet Data Protocol context.

10. The method of claim 9, wherein establishing the Packet Data Protocol context includes allocating a predefined Network layer Service Access Point Identifier value.

11. The method of claim 9, further comprising establishing at least one implicit Packet Data Protocol context between the mobile station and a support node.

12. The method of claim 9, further comprising establishing at least one implicit Packet Data Protocol context between the support node and a Serving Mobile Location Centre currently serving the mobile station.

13. The method of claim 9, further comprising establishing at least one explicit Packet Data Protocol context between the support node and a Serving Mobile Location Centre currently serving the mobile station.

14. The method of claim 1, wherein the request is received by a Gateway Mobile Location Centre, and the method further comprises retrieving, by the Gateway Mobile Location Centre the location service information via a Mobile Services Switching Centre, which in turn retrieves the location service information via a Serving Mobile Location Centre, directly, if a circuit-switched connection has been established for the mobile station, and, otherwise, indirectly, via a Serving GPRS Support Node.

15. The method of claim 14, further comprising sending from the Gateway Mobile Location Centre to the Mobile Services Switching Centre the address of the Serving GPRS Support Node.

16. An arrangement for supporting location service information related to a mobile station in a mobile communications system supporting circuit-switched communications and packet-switched communications, the arrangement being configured to:

receive a request from a requesting entity;

retrieve the location service information related to the mobile station; and provide a response to the request;

determine a preferred type of connection for the retrieving on the basis of a first set of predetermined criteria; and to perform at least a first attempt to retrieve the location service information via the preferred type of connection.

* * * * *